United States Patent [19]

Dickson et al.

[11] 4,431,912
[45] Feb. 14, 1984

[54] METHOD FOR CONTROLLING THE OPERATION OF AN OPTICAL SCANNER

[75] Inventors: LeRoy D. Dickson; Charles M. Pierce, both of Raleigh; Olen L. Stokes, Cary; Norman J. Woodland, Raleigh, all of N.C.

[73] Assignee: International Business Machines Corp., Armonk, N.Y.

[21] Appl. No.: 321,036

[22] Filed: Nov. 13, 1981

[51] Int. Cl.³ .............................................. G06K 7/10
[52] U.S. Cl. .................................. 235/466; 235/463; 235/462; 235/457; 235/455
[58] Field of Search ............... 235/466, 454, 457, 455, 235/377, 435, 379, 463

[56] References Cited

U.S. PATENT DOCUMENTS

| | | | |
|---|---|---|---|
| 3,582,617 | 6/1971 | Berler | 235/458 |
| 3,961,162 | 6/1976 | Wells | 235/435 |
| 3,973,107 | 8/1976 | Walter | 235/458 |
| 4,157,783 | 6/1979 | Muster et al. | 235/379 |
| 4,298,859 | 11/1981 | Feilchenfeld | 340/146.3 Z |
| 4,329,574 | 5/1982 | Jordan, Jr. | 235/463 |
| 4,342,050 | 7/1982 | Traino | 358/256 |

FOREIGN PATENT DOCUMENTS 506878  5/1976  U.S.S.R. ............................ 235/454

Primary Examiner—A. D. Pellinen
Assistant Examiner—Robert Lev
Attorney, Agent, or Firm—Gerald R. Woods

[57] ABSTRACT

An optical scanner in a retail store checkout stand includes a single item detector upstream of the scanner window. Output signals from the item detector and from symbol recognition logic are used to open and close a shutter in the beam path of the scanner laser. The shutter is opened and a first time out sequence is started when the beam path is interrupted. A second, short time out sequence is restarted each time a valid symbol is recognized. A third time out sequence of intermediate length supersedes the first time out sequence when the beam path is cleared. The laser shutter is closed and the symbol is transferred to a terminal or controller upon the completion of any active time out sequence or upon recognition of a predetermined number of identical symbols, whichever comes first.

7 Claims, 6 Drawing Figures

METHOD FOR CONTROLLING THE OPERATION OF AN OPTICAL SCANNER

TECHNICAL FIELD

The present invention relates to optical scanners and more particularly to a method of controlling the operation of an optical scanner having a single item detector.

PRIOR ART

One of the more significant changes which is taking place in supermarket operations is the increasing use of computer-based point-of-scale systems. Such systems may include optical scanners capable of reading bar code symbols printed on or otherwise attached to an item package by the producer or, in some instances, by the supermarket operator.

A typical optical scanner is incorporated into a customer checkout stand with most of the scanner components being located out of sight below the checkout stand surface. The few scanner components which are visible to the customer or checkout clerk include a transparent scanner window in the checkout stand surface, a first item detector which is located upstream of the scanner window and a second item detector which is located downstream of the scanner window. In the context of this application, the term "upstream" refers to that side of the scanner window where an operator receives items which are to be scanned. The term "downstream" refers to that side of the scanner window where the operator moves each grocery item after it has been scanned.

The typical scanner includes a laser and a scan pattern generator which deflects light emanating from the laser to produce a multiple-line scan pattern at the scanner window. When a grocery item is passed over the scanner window, the laser beam is reflected from that item back through the scanner window. The amount of light that is reflected at any given instant of time depends on the reflectivity of the grocery item at the point at which it is being struck by the beam. When the beam is crossing a bar code symbol, the reflected optical signal is representative of the symbol structure.

A photodetector converts the optical signal to an electrical signal which is applied to dedicated hardware or to a microprocessor which finds and decodes the symbol in the stream of electrical signals. When the symbol has been found and decoded, it is passed on to a point-of-sale terminal or a store controller where it is used to access records which provide a brief description of the grocery item as well as pricing information. The item description and pricing information are used within a point-of-sale terminal at the checkout lane to prepare a descriptive customer receipt tape and to calculate transaction totals.

It has been universally recognized that it is desirable to limit the duration of any scanning operation for reasons of safety and productivity. The type of lasers used in optical scanners cannot be cycled on and off rapidly and are left on continuously when a checkout stand is in use. In a conventional scanner, a mechanical shutter is interposed in the laser beam path within the scanner. This shutter remains closed to block the laser beam until the upstream item detector beam is interrupted, presumably by a grocery item to be scanned.

Once the shutter is opened, it remains open until one of several conditions occurs. In known prior art scanners, the shutter can remain open until the item clears the second, downstream item detector, until a predetermined minimum period of time elapses after the first item detector was blocked or until the symbol recognition logic locates a predetermined plural number of potential symbols. Depending upon the location of a symbol on a grocery item and the orientation of that item as the operator passes over the scanner, the shutter in such a scanner may remain open for a relatively long period of time even after the symbol has been scanned and has moved well beyond the "field of view" of the scan pattern.

While precautions are taken in the design of the scanner unit, the scan pattern, etc., to minimize the chance that a person could ever view a laser beam head on at an optical scanner, it is still desirable to limit "pattern on" time; that is to, generate a scan pattern only when absolutely necessary for the symbol reading function. Therefore, the shutter in the laser beam path should be closed as soon as possible after the symbol has moved beyond the "field of view" of the scanner.

It is also desirable to limit the duration of any actual scan operation from the standpoint of productivity. In known scanners, a symbol which has been found and decoded by the scanner is not actually transferred or shipped to the terminal or controller for price lookup operations, etc., until the item clears the second, downstream detector or until a relatively long period of time has expired after the initial interruption of the beam path of the upstream detector. Upon receipt of the symbol, the terminal or controller can send an acknowledgement or feedback signal to the operator.

If this feedback, which may take the form of an audible and/or visible indicator, is delayed, the operator will hesitate before releasing the item she is holding. This hesitation disrupts the operator's rhythm in handling the items and can greatly reduce operator productivity at the scanner. Since increased productivity is one of the reasons for using scanners in the first place, anything which reduces such productivity presents a serious problem for the user.

SUMMARY

The present invention is an improved method for controlling the operation of an optical scanner to reduce the average amount of time that a laser shutter remains open and to reduce the time required for an audible/visible verification that a scanned symbol has been received at a terminal or controller.

The method is to be used with the type of optical symbol scanner which includes a coherent light source, a single item detector capable of producing signals indicating the presence or absence of an item and the means for recognizing symbols carried by such an item. The method includes the steps of producing an item-scanning light pattern in response to a first output from the single item detector. The light reflected from the item is analyzed to locate and decode any symbol carried by the item. One or more timeout sequences are initiated as a function of outputs from the item detector and from the symbol recognition means. The light pattern is terminated and at least one recognized symbol is substantially simultaneously transferred from the scanner upon the earliest completion of any initiated timeout sequence.

It should be noted that these functions are performed without the need for a downstream item detector, which reduces the cost and complexity of any scanner which is controlled in accordance with the subject method. The method also reduces "pattern on" on time and permits increased throughput without a need for a downstream item detector.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figure 1:
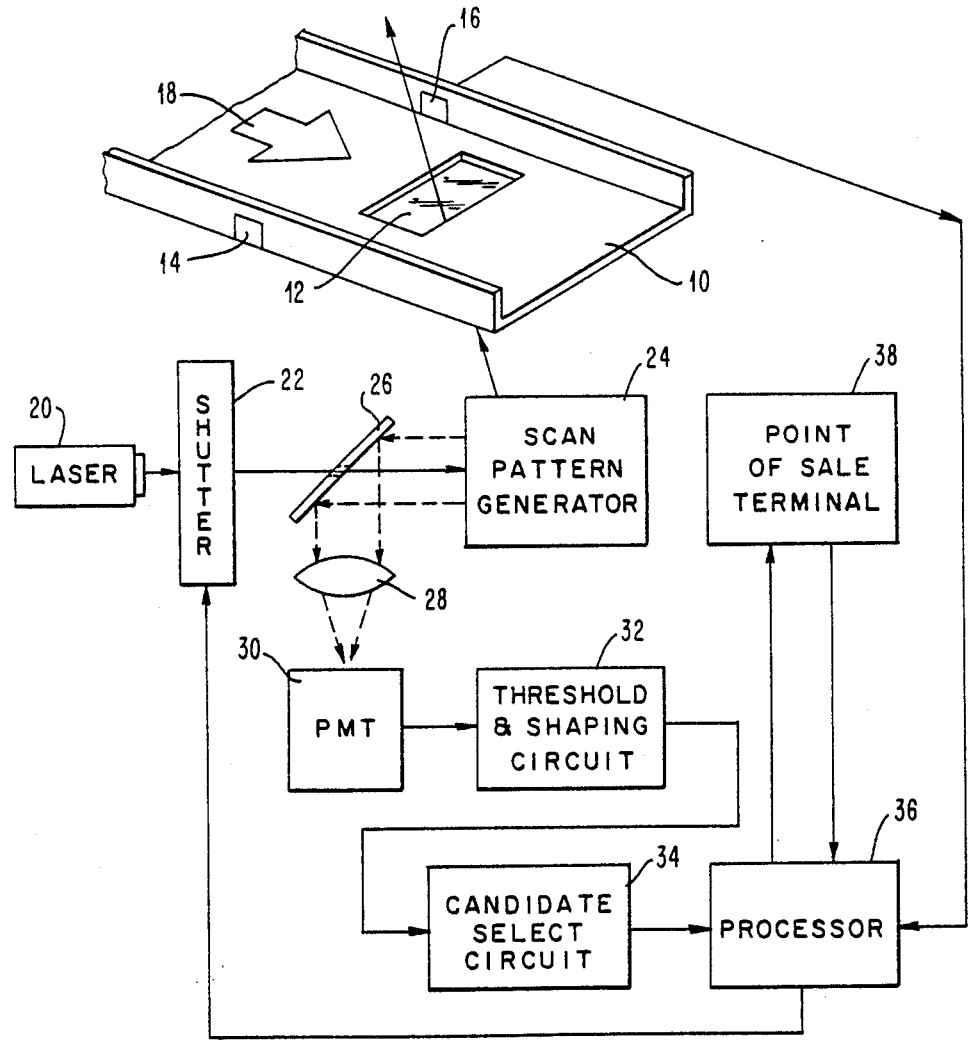
FIG. 1 is a block diagram of a point-of-sale system including an optical scanner which can be controlled in accordance with the inventive method.

Referring to FIG. 1, the type of scanner in which the present invention can be used is normally incorporated into a checkout stand. The top scanner surface 10 of the scanner unit includes a transparent scanner window 12, a light source 14 and a light detector 16. The source 14 and detector 16 are collectively referred to as an item detector. When a grocery item is transported through the beam path of the item detector, normally in the direction indicated by arrow 18, the interruption of the beam can cause a scan operation to begin.

The scanner components located below the top surface 10 include a laser 20. Laser 20 remains energized continuously when a checkout stand is in use regardless of whether grocery items are being processed at any particular instant of time. A mechanical shutter 22 can either block or pass the laser beam, depending upon conditions which will be discussed in more detail later. When the laser beam is passed through the shutter 22, it is directed through a small opening in a diverter mirror 26 to a scan pattern generator 24. The function of scan pattern generator 24 is to generate a multiple-line scan pattern.

Light reflected from a grocery item may take a retroreflective path through the scan pattern generator 24 to the diverter mirror 26. The mirror 26 directs most of the returning light through a condensing lens 28 to a photomultiplier tube 30 or a similar light detector. The photomultiplier tube 30 converts the returned optical signal to a corresponding electrical signal which is applied to the threshold and shaping circuit 32. The function of the threshold and shaping circuit 32 is to convert the often irregular electrical signals provided by photomultiplier tube 30 into a square wave pulse train in which the duration of each pulse is a function of the width of the light or dark area being traversed by the laser beam. The output of the threshold and shaping circuit 32 is applied to a candidate select circuit 34 which isolates any symbol-representing signals from the overall string of signals, most of which are optical noise produced when the laser beam traverses text or graphics. Candidates selected in circuit 34 are applied to a processor 36 which selects one of those candidates as the final symbol, decodes that symbol and sends it to a point-of-sale terminal 38 where price lookup, inventory control, etc., operations are initiated. A second input to the processor 36 is provided by the detector 16 of the item detector. Processor 36 controls whether the shutter 22 is open or closed in accordance with the method which will be described in more detail with reference to FIGS. 2 and 3.

Figure 2:
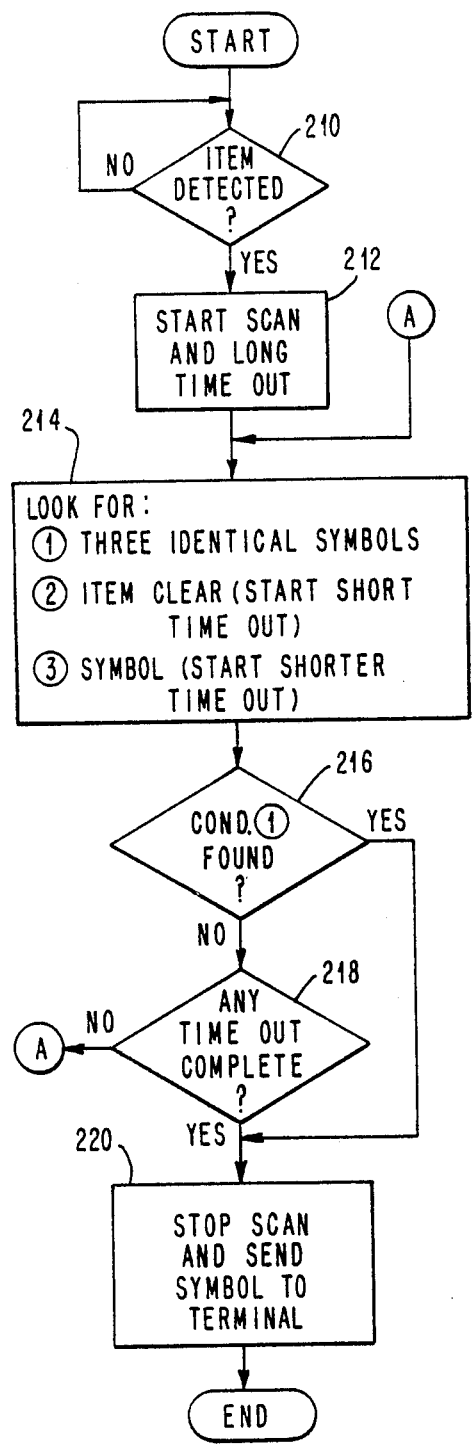
FIG. 2 is an extremely general flow chart which provides an overview of the method.
Figure 3A:
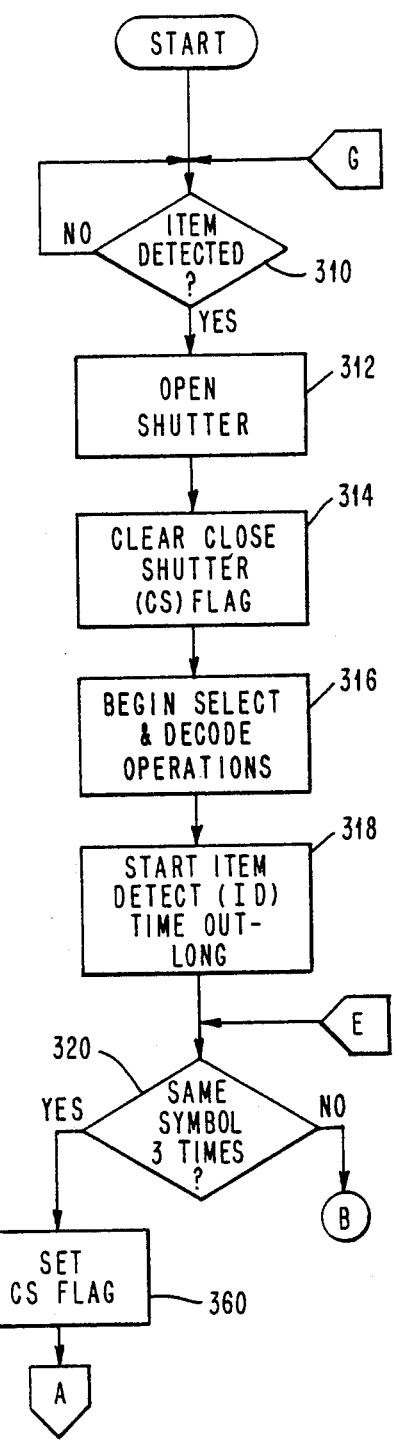
FIG. 3, consisting of FIGS. 3A–3D taken together, is a more detailed flow chart of the method steps.
Figure 3B:
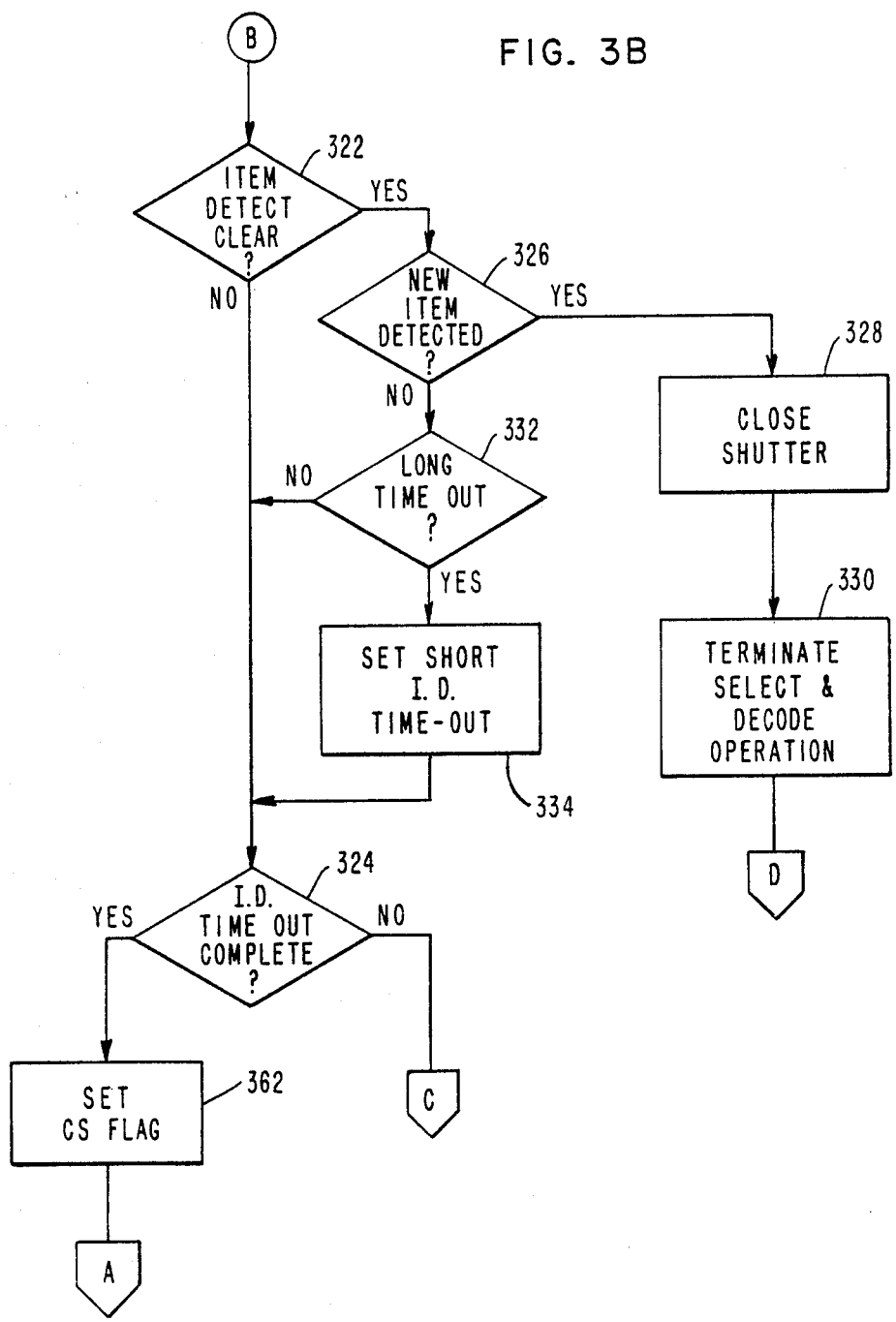
Figure 3C:
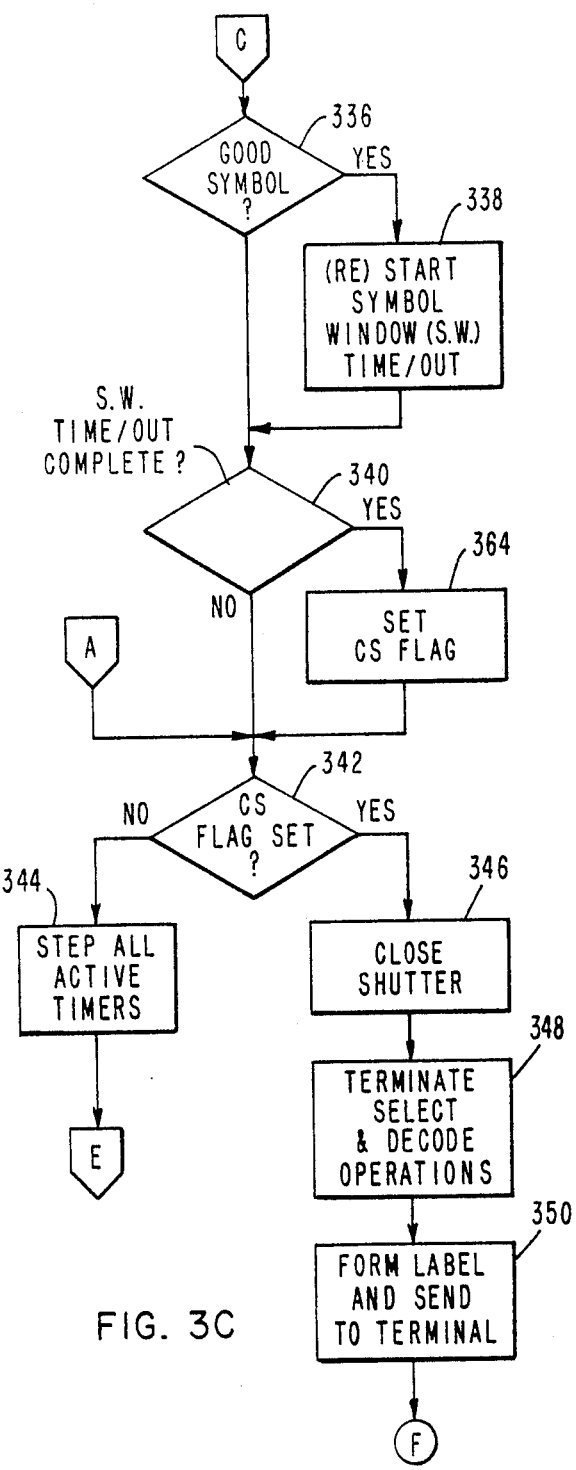
Figure 3D:
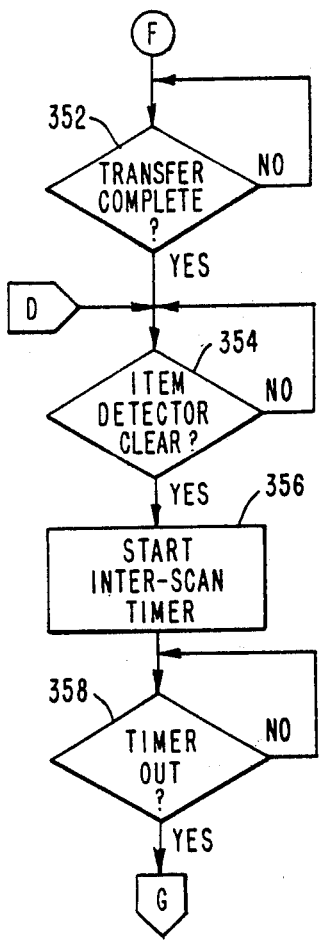

FIG. 2 is an extremely brief flow chart which provides an overview of the scan operation controlling method. Of necessity, FIG. 2 omits a considerable number of details about the method steps which are performed. These details are provided later with reference to FIGS. 3A–3D.

At the start, the output of the item detector is continuously monitored (block 210). When the beam path is broken, a scan is normally started (block 212). When the scan is started, a relatively long timeout sequence (on the order of one second) is also begun. While the scan pattern is being generated, the processor 36 monitors the signals from the candidate select circuit 34 and the light detector 16 for several different conditions. The first condition is where three identical symbols have been found and decoded. The second condition is a change in the output from the light detector 16 indicating that the beam path is no longer being interrupted; that is, that the item has cleared the item detector. If and when this condition is found, a short timeout is started. The short timeout may be on the order of 10%–20% of the long timeout. The rationale for instituting a short timeout when the item detector is cleared is that there should be relatively little time left during the normal item motion during which a symbol could still be read. Therefore, there is no reason to continue the scan beyond the short time.

The third condition is the detection of any valid symbol at the input to processor 36 from the candidate select circuit 34. When a valid symbol is detected, an extremely short timeout is begun. The rationale for the extremely short timeout is that a valid symbol, once detected, will be in the scanner field of view for only a very short period of time. There would be no point in continuing the scan once the symbol passes beyond the field of view.

In the course of the scan operation, a check is made as to whether three identical symbols have been found (block 216). If less than three identical symbols have been found, a further check (block 218) is made as to whether any active timeout has been completed. If less than three identical symbols have been found and if no timeout is completed, the processor 36 will continue to monitor scanner operation while holding the shutter 22 open. If, however, three identical symbols have been found or any active timeout has been completed, the scan operation is stopped (block 220). The processor 36 immediately sends the finally selected symbol to the point-of-sale terminal or store controller at this time for price lookup operations, etc.

Two things are apparent even from the overview flow chart. First, the termination of scanner operation or the closing of the shutter 22 is not dependent upon the output of any second, downstream item detector. Second, a selected symbol is forwarded to the point-of-sale terminal or store controller promptly upon termination of the scan and is not delayed by having to wait until a second, downstream item detector is cleared.

FIGS. 3A–3D, taken together, comprise a single flow chart of the steps which would be taken to implement the subject method by programming a general purpose processor. Connectors between two flow chart points on the same page take the form of small circles with matching alphabetic characters. Connectors between flow chart segments on different pages take the form of pentagons with matching alphabetic characters.

Before a scanning operation begins, the processor 36 monitors the output of the light detector 16 in the item detector (block 310). When the item detector beam is interrupted, the processor 36 responds by opening the shutter 22 (block 312) to allow the multi-line scan pattern to be generated and projected through the scanner window 12. A close shutter (CS) flag is cleared (block 314) and the operations of selecting symbol candidates from the stream of data and decoding of those candidates is begun (block 316). Substantially simultaneously with the opening of the shutter, an item detect (ID) timeout on the order of one second is started (block 318). In a general purpose processor, the timeout may be accomplished by the conventional expedient of setting a register to some initial count and then incrementing or decrementing the contents of that register at a fixed rate. When the register reaches a certain value, the timeout is deemed to have been completed.

A check is made (block 320) to determine whether the same symbol has been found and decoded three times. While the symbols are selected and decoded asynchronously of the routine being described, there is very little chance that this condition will be met on the first pass through the routine. Assuming the same symbol has not been detected three times, a check is made (block 322) to determine whether the item detector has been cleared by whatever was blocking the beam path. If the item detector has not been cleared, a check is then made (block 324) to determine whether the item detect time out has been completed.

As will no be described, the item detect timeout may either be the long timeout started at block 318 or a shorter timeout initiated in accordance with the following. If the check made at block 322 indicates that the item detector has been cleared, a decision is then made as to whether the beam has again been interrupted (block 326); that is, whether a new item has been detected. If the time detector beam is interrupted twice during a single scan operation, this may mean that two grocery items are being moved across the window substantially simultaneously. Under those conditions, a scanner might find, decode and compile parts of two different symbols into a single false symbol. Therefore, if a second interruption is found at block 326, the processor 36 responds by immediately closing shutter 22 (block 328) and by terminating all select and decode operations (block 330). Any symbols which have already been found and decoded are discarded.

If the item detector has been cleared and no new item has been detected, a check is made (block 332) to determine whether the originally initiated long timeout is still active. If the long timeout has not yet been completed, the shorter item detector timeout is initiated (block 334) before the check is made as to whether the item detector active timeout (long and/or short) has been completed. In a preferred embodiment of the invention, the long and short item detect timeouts are mutually exclusive. If a short item detect timeout is instituted, it replaces the long item detect timeout. Assuming the active item detect timeout is not completed (block 324), a check is then made (block 336) to determine whether the processor 36 has found at least one good symbol. If at least one good symbol has been found, which means that the symbol has already entered the field of view of the scanner, a symbol window (SW)timer is started. The SW timeout is of extremely short duration since any symbol which is already in the field of view of the scanner will move beyond it very quickly as the item is moved by an operator. It should be noted that the symbol window timer is restarted each time the good symbol is detected. Therefore, a check made in block 340 cannot indicate that the SW timeout is complete until a predetermined minimum period of time elapses after the last good symbol has been detected.

Assuming that the check for an SW timeout completion is negative, a decision must then be made (block 342) as to whether the close shutter or CS flag has been set at some point during the routine. The conditions under which the CS flag does become set are described below. Assuming for the moment that the CS flag is still clear, then each active timer, which may include the item detect timer and the symbol window timer, is stepped (block 344) before the program is re-entered at the beginning of operation 320.

If the check made at block 342 indicates that the CS flag has been set at some point in the routine, the shutter 22 is closed immediately (block 346) and all select and decode operations are terminated (block 348). If the processor 36 has decoded a valid symbol prior to termination of the select and decode operations, that symbol is forwarded immediately to the point-of-sale terminal or store controller for price lookup operations and the like. It is, of course, possible that the processor 36 may have to choose between different possible symbols. Any technique employed in choosing between one of several possible symbols is outside the scope of this invention and is not discussed.

But assuming that a symbol has been transferred to the terminal, the processor 36 waits for an acknowledgement that the symbol has been received (block 352) before readying the scanner for the next scan operation. Once the symbol transfer has been found to be complete by the processor, the processor monitors the output of the item detector and waits for it to clear (block 354) before an inter-scan timer is started (block 356). The inter-scan timer insures a short delay which allows any item in the vicinity of the scanner to clear the scanner before the next scan operation is started. Once the inter-scan timeout has been completed (block 358) the scanner is ready for the next scan operation.

There are a number of conditions under which the scan operation is terminated. Referring back to block 320, if the processor 36 detects the same symbol three times, the CS flag is set immediately (block 360) and the program branches directly to the input of block 342 which can be described as the start of the scan termination sequence.

Referring to block 324, the completion of an item detect time out (which may be long if the item detector remains blocked or short if the item detector has been cleared) will cause the CS flag to be set (block 362). If the CS flag is set in block 362, the program enters the termination sequence at block 342.

Referring to block 340, the CS flag can be set (block 364) upon completion of the symbol window timeout. As noted earlier, the symbol window timeout is restarted each time a valid symbol is detected so that the timeout cannot be completed for a predetermined period of time after the last valid symbol has been detected.

When a general purpose processor has been programmed in accordance with the above described method, the operation of the scanner can be effectively controlled using a single item detector. Eliminating the second item detector reduces both the cost and complexity of the scanner. By terminating scanner operation and transferring a selected symbol upon the first to occur of any of several possible active timeouts or upon the detection of three identical symbols, the response time of the point-of-sale system can be improved relative to those systems in which symbol transfer cannot take place until a second, downstream item detector had been cleared.

While there has been described what is considered to be a preferred embodiment of the invention, variations and modifications therein will occur to those skilled in the art. For example, while the invention has been described in terms of program steps which could be performed in a general purpose processor, the same steps could be carried out in special purpose logic circuits. Therefore, it is intended that the appended claims shall be construed to include the performance of the claimed method in either a hardware or a software environment as well as other variations or modifications that fall within the true spirit and scope of the invention.

Having thus described my invention, what I desire to protect by Letters Patent is:

1. For use with the type of optical symbol scanner having a coherent light source, a single item detector capable of producing signals indicating the presence or absence of an item and means for recognizing symbols carried by such an item, an improved scan operation controlling method comprising the steps of:
producing an item-scanning light pattern in response to a first output signal from said item detector;
analyzing light reflected from said item to locate and decode any symbol carried thereon;
initiating one or more time out sequences as a function of output signals from said item detector and said symbol recognition means; and
terminating the light pattern and substantially simultaneously transferring at least one recognized symbol from the scanner for further processing upon the earliest completion of any initiated time out sequence.

2. For use with the type of optical symbol scanner having a coherent light source, a single item detector capable of producing signals indicating the presence or absence of an item and means for recognizing symbols carried by such an item, an improved scan operation controlling method comprising the steps of:
producing an item scanning light pattern in response to a first output signal from said item detector;
analyzing light reflected from said item to locate and decode any symbol carried thereon;
initiating a first time out sequence in response to the first output signal from said item detector;
initiating a second, shorter time out sequence upon the earliest recognition of a symbol;
terminating the light pattern and substantially simultaneously transferring at least one recognized symbol from the scanner for further processing upon the earliest completion of any initiated time out sequence.

3. A scan operation controlling method as recited in claim 2 including the additional step of initiating a third time out sequence upon occurrence of a second output signal from said item detector, the duration of said third time out sequence being greater than that of said second time out sequence but less than that of said first time out sequence.

4. A scan operation controlling method as defined in claim 3 wherein the first output signal from said item detector is generated when an item is first detected and the second output signal is generated when the item has passed the item detector.

5. A scan operation controlling method as defined in either of claims 2 or 3 wherein the second time out sequence is re-initiated each time a symbol is recognized.

6. A scan operation controlling method as recited in claim 4 including the additional step of teminating the light pattern without transferring any symbol if the item detector produces another first output signal prior to the completion of an active third time out sequence.

7. A scan operation controlling method as recited in claim 3 including the additional step of terminating the light pattern and substantially simultaneously transferring a recognized symbol upon a signal from said symbol recognition means indicating the same symbol has been found a predetermined number of times.

* * * * *